(12) United States Patent
Yung et al.

(10) Patent No.: US 8,027,962 B2
(45) Date of Patent: Sep. 27, 2011

(54) TECHNIQUES FOR ASYNCHRONOUS COMMAND INTERFACE FOR SCALABLE AND ACTIVE DATA WAREHOUSING

(75) Inventors: Alex P Yung, Anaheim, CA (US); Clovis Franklin Lofton, Westlake Village, CA (US)

(73) Assignee: Teradata US, Inc., Daytona, OH (US)

( * ) Notice: Subject to any disclaimer, the term of this patent is extended or adjusted under 35 U.S.C. 154(b) by 388 days.

(21) Appl. No.: 11/901,039

(22) Filed: Sep. 14, 2007

(65) Prior Publication Data

US 2009/0077005 A1    Mar. 19, 2009

(51) Int. Cl.
    *G06F 17/30*    (2006.01)

(52) U.S. Cl. ........ 707/703; 709/238; 709/226; 709/217; 712/20; 712/16

(58) Field of Classification Search ................ 707/1, 10, 707/200, 703, 999.001; 709/238, 229, 226, 709/217; 712/229, 203, 28, 20, 16, 11
    See application file for complete search history.

(56) References Cited

U.S. PATENT DOCUMENTS

| | | | | |
|---|---|---|---|---|
| 5,752,067 A | * | 5/1998 | Wilkinson et al. | 712/16 |
| 5,754,871 A | * | 5/1998 | Wilkinson et al. | 712/20 |
| 5,761,523 A | * | 6/1998 | Wilkinson et al. | 712/20 |
| 6,594,651 B2 | | 7/2003 | Kabra et al. | |
| 6,615,258 B1 | * | 9/2003 | Barry et al. | 709/223 |
| 6,952,692 B1 | | 10/2005 | Bhattiprolu et al. | |
| 6,981,267 B1 | | 12/2005 | Mallet et al. | |
| 7,225,444 B1 | | 5/2007 | Yung et al. | |
| 7,321,939 B1 | * | 1/2008 | Porter | 709/238 |
| 7,818,470 B2 | * | 10/2010 | Wang et al. | 710/18 |
| 2002/0143862 A1 | * | 10/2002 | Peterson | 709/203 |
| 2002/0174379 A1 | | 11/2002 | Korenevsky et al. | |
| 2004/0068479 A1 | * | 4/2004 | Wolfson et al. | 707/1 |
| 2005/0223109 A1 | * | 10/2005 | Mamou et al. | 709/232 |
| 2006/0101475 A1 | | 5/2006 | Mallet et al. | |
| 2006/0271507 A1 | | 11/2006 | Anzalone et al. | |
| 2006/0271568 A1 | | 11/2006 | Balkir et al. | |
| 2007/0061375 A1 | * | 3/2007 | Brown et al. | 707/200 |
| 2008/0306950 A1 | * | 12/2008 | Richards et al. | 707/8 |
| 2009/0049024 A1 | * | 2/2009 | Brown et al. | 707/4 |

* cited by examiner

*Primary Examiner* — Jean M Corrielus

(74) *Attorney, Agent, or Firm* — Schwegman, Lundberg & Woessner

(57) ABSTRACT

Techniques for asynchronous command processing within a parallel processing environment are provided. A command is raised or received within a parallel processing data warehousing environment. A job or a component of the job is dynamically monitored, controlled, or modified in response to the real-time processing of the command. The job is actively processing within the parallel processing data warehousing environment when the command is received and processed against the job or the component of the job.

20 Claims, 3 Drawing Sheets

TECHNIQUES FOR ASYNCHRONOUS COMMAND INTERFACE FOR SCALABLE AND ACTIVE DATA WAREHOUSING

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example source code as described below and in any drawings hereto: Copyright© 2007, NCR Corp. of Dayton, Ohio—All Rights Reserved.

BACKGROUND

One of the recent trends emerging in the Data Warehousing marketplace is further integration of Data Warehouses into the Enterprise Information Technology (IT) infrastructure. Active Data Warehousing is finding wider acceptance across different industries. The origin of the active data warehouse is the timely, integrated store of detailed data available for tactical and strategic business decision making. The "active" traits are supplemental to traditional data warehouse functionality. For example, the complex, strategic decision queries normally found in traditional data warehouse can be expanded to support short, tactical queries, with real-time data feeds, and possibly event-driven updates, all occurring at the same time.

One of the major differences between an active data warehouse and a traditional data warehouse is that the former lacks the clearly identified load and query cycles; which mean the data can be continuously loaded and continuously queried, usually with 24 hours by 7 days per week (24×7) availability. Analytical applications, too, may be running continuously. Source data may appear at unpredictable times. System resources and requirements can change while jobs are running. Long running jobs may need to be monitored for their ad-hoc data access and acquisition, suspended for system resource constraints, and resumed when those resources become available. In addition, high data freshness and data consistency are also important requirements for the success of the Active Data Warehouse. As such, data warehousing components are required to be more intelligent and controllable, in real-time or in batch, in terms of what data is to be optimally accessed (or processed) at what time. Job status and events need to be monitored, and sometimes need to be acted on at the right time to ensure efficient and timely data access and loading.

To address these issues, a flexible software component is needed, which would allow users to monitor, modify, and control the performance and resource parameters of running jobs such that job events can be handled and system resources can be used in an effective manner. This is all due to the fact that there is a much higher demand for real-time tactical decision queries in the active data warehousing environment than for strategic decision queries in the traditional data warehouse environment.

Thus, improved mechanisms for asynchronous command processing in a parallel processing environment are desirable.

SUMMARY

In various embodiments, techniques for real-time and dynamic processing of commands that affected actively processing services within a parallel processing data warehousing environment are provided. More particularly, an asynchronous command for a service is received. The service is already processing in real time within a parallel processing data warehousing environment. The command is dynamically processed to perform one or more of the following within the parallel processing data warehousing environment: gather information about the service, perform an action on the service, schedule the action for the service, configure the service for the service to perform a subsequent action, perform one or more additional actions associated with one or more resources, and alter the processing associated with the service.

DETAILED DESCRIPTION

Figure 1:
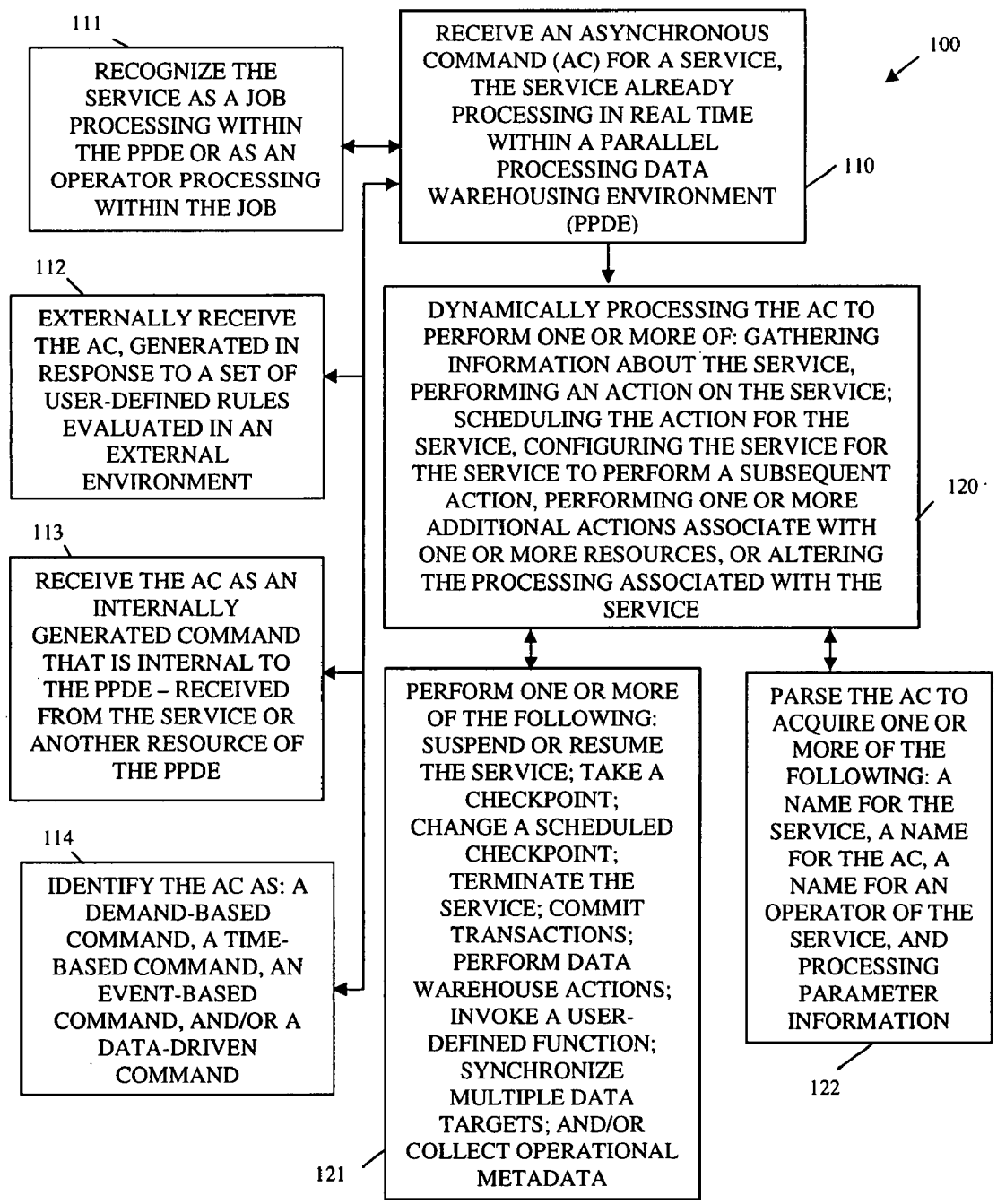
FIG. 1 is a diagram of a method for processing an asynchronous command within a parallel processing data warehousing environment with respect to a processing service, according to an example embodiment.

FIG. 1 is a diagram of a method 100 for processing an asynchronous command within a parallel processing data warehousing environment with respect to a processing service, according to an example embodiment. The method 100 (herein after referred to as "asynchronous command processing service") is implemented in machine-accessible or computer-readable media as instructions and is executed by one or more machines (processing devices). Moreover, the asynchronous command processing service is accessible over a network. The network may be wired, wireless, or a combination of wired and wireless.

As used herein the phrase "parallel processing data warehousing environment" refers to an active data warehouse processing environment in which data is extracted, transformed, and loaded (referred to as "ETL") in a parallel processing environment in real-time and in a dynamic fashion. So, data can queried and updated simultaneously and in a real-time and dynamic manner.

One technique for such an environment and for processing modules that support operations in an active data warehouse processing environment can be found with the Teradata Parallel Transporter® (referred to as "TPT") product offering, distributed by NCR Inc., of Dayton, Ohio. This product operates on the Teradata® product, which is a data warehouse and which is also distributed by NCR Inc., of Dayton, Ohio. These techniques for the TPT and Teradata® are incorporated by reference herein.

A "database" as used herein refers to a data warehouse. The warehouse can be a relational database, a file, a queue, a table, directory, or other sources of data or combinations of these things that are logically organized and cooperate via interfaces as a single accessible and updatable entity or resource.

Essentially, in a parallel processing data warehousing environment software processes called "operators" provide access to external resources, such as files database management system (DBMS) tables, messaging middleware products, etc. and perform various filtering and transformation functions. A data stream data structure is used for interchanging data between operators. A typical data stream connects two operators: one of them known as a "producer," which writes data to the data stream; and another one known as a "consumer," which reads the data from the data stream.

Multiple instances of any given operator can be launched within the parallel processing data warehousing environment. Each instance is typically assigned to a system process or thread, and therefore, can execute independently of and concurrently (in parallel—at the same time) with the other instances. So, multiple instances of a producer operator collect data from multiple data sources; the data is written to each instances data stream. The data streams are dynamically merged and split across multiple processing instances of the consumer operator that then uses the data.

The term "asynchronous" is used herein to imply two different situations. First, users can issue or cause to be issued commands from outside the address space of services processing within the parallel processing environment, such as outside the address space of the TPT. So, "commands" and "external commands" may be used interchangeably herein and below. Second, commands are processed in an asynchronous manner (traditional view of asynchronous). So, while a service (such as the TPT) is in the middle or performing ETL operations the command can be received and immediately processed by the service. Moreover, this permits operators to a single job (multiple operators processing in parallel to form the job) to communicate with each other within the job via these asynchronous commands. So, events can be shared between operators or components of a single job in real time and in a parallel processing environment.

Also, as used herein a "service" is a special type of resource that executes within the parallel processing data warehousing environment. In an embodiment, the service when not qualified by any additional adjective refers to a job within a parallel processing data warehousing environment or a component of the job, such as an operator discussed above (producer or consumer).

An "external environment" is one in which is remote and external to the parallel processing data warehousing environment. This may occur over a network via a Wide Area Network (WAN) (such as the Internet, etc.) or may occur over a Local Area Network (LAN). Additionally, in an embodiment, the external environment is located on the same machine or set of machines as the parallel processing data warehousing environment but is external because it is defines as a Virtual Machine (VM), which is different from a different VM or set of VM's associated with the parallel processing data warehousing environment. It is also noted that a single machine may have multiple nodes in a parallel processing environment, such that the command can be external and yet be issued from the same machine. A bridge can be used to interject the command into the parallel processing data warehousing environment, such that it is detected there and processed there.

The asynchronous command processing service may be viewed as a software component processing within the parallel processing data warehousing environment that users or a rule evaluator (that evaluates user-defined rules) can issue asynchronous commands to for parallel processing jobs (services) or components of a particular job (also referred to as a service or operator (consumer or producer)).

So, as will be demonstrated more completely herein and below users can interrupt an asynchronous command processing service job (service) to perform job monitoring or controlling functions, which can be asynchronous command processing service-provided (internally) or user-defined (externally based). Users can also define their own rules for issuing these commands (discussed more completely below with reference to the method 200 of the FIG. 2. This rule-enabling capability can help improve operational efficiencies, streamline processing of their ETL jobs, and enable the enterprise to react to events in a more timely fashion.

In an embodiment, these commands work in an integrated manner with the existing features in TPT. For example, a "STATUS" command can collect the most current status information about a job, which by default, also collects status information at important milestones of the job. The "CHECKPOINT" command takes an immediate checkpoint, in addition to any originally scheduled checkpoints, such that queries right after the "CHECKPOINT" command pick up the latest information from the database that is in the middle of being loaded. Therefore, the use of these commands not only provides more monitoring capability and controllability to the Active Data Warehouse, but also extends the existing TPT features to cope with real-time requests to provide users with the most accurate, consistent, real-time, and close-to-real-time information for tactical decision support.

Thus, one result of the processing for the asynchronous command processing service, which is described herein and below, is to provide a user-oriented, asynchronous, rule-enabling command interface, which allows users to issue a wide variety of requests and actions in terms of "commands" against parallel processing jobs, such as but not limited to against TPT jobs, in an asynchronous manner. Again, by "asynchronous manner", it is meant that users can issue commands from the system console, a "task," or a "process, (via rules)" to jobs while they are running or components or parallel processing jobs, such as operators (consumer and producer in the TPT-based embodiments).

It is within this initial context that the processing associated with the asynchronous command processing service is now discussed in detail.

At 110, the asynchronous command processing service receives an asynchronous command (herein after "command") for a service. The service is already executing in real time within a parallel processing data warehousing environment.

In an embodiment, at 111, the asynchronous command processing service recognizes the service, which is associated with the command, as a job processing within the parallel processing environment or an operator processing within the job. The operator can be a consumer operator or a producer operator that can process as multiple instances within the job.

The command may be received by the asynchronous command processing service in a variety of different manners.

For example, at 112, the asynchronous command processing service receives the command from an external environment that is external to the address space of the parallel processing environment and the asynchronous command processing service. The command is generated in response to a set of user-defined rules, which is evaluated within the external environment and which is sent or communicated from the external environment to the asynchronous command processing service within the parallel processing data warehousing environment.

In another case, at 113, the asynchronous command processing service receives the command as an internally generated command. It is internal in the sense that the command is generated and communicated within a resource associated with the parallel processing data warehousing environment. In fact, it can be received from the service itself or from another resource associated with the parallel processing data warehousing environment.

The command can also be associated or can originate based on a variety of circumstances.

For example, at 114, the asynchronous command processing service recognizes and executes the command as a demand-based command, a time-based command, an event-based command, and/or a data-driven command.

The demand-based command provides users with on-demand control of and access to operational resources and data associated with running jobs, such as the service. The decisions of issuing these commands are usually in response to ad-hoc situations such as system resource shortage, sudden performance degradation, ad-hoc data synchronization/alignments, terminating a job, etc.

The time-based command is driven by date-time or time-intervals. For example, users can schedule and periodically monitor and control the execution of a job such that data can be collected and processed at the right time for the right user.

The event-based command is driven by "events," which can be defined as conditions based on application requirements. For example, system resources thresholds, status codes, error limits, Database System (DBS) restart, beginning or ending of data acquisition, and so on, can be defined as conditions for event evaluations. This type of command can gain maximum advantage from every available hardware/system resource and optimize data access in complex, ad hoc environments.

The data-driven command is usually driven by the operators (consumer or producer). The level of information can be data patterns, data set associations, transactional boundaries, etc. For example, operators can issue a checkpoint command based on transactional semantics or internal loading/exporting milestones that are known to the operator.

At 120, the asynchronous command processing service dynamically processes the command to perform a variety of actions. The actions can include one or more of the following: gathering information about the service, performing an action on the service, scheduling the action for the service, configuring the service for the service to perform a subsequent action, performing one or more additional actions associated with one or more resources, and/or altering the processing associated with the service. It is noted that some actions associated with the command may gather information about the service a component of the service, such as an operator, and/or the parallel processing data warehousing environment as a whole.

In an embodiment, at 121, some of the actions may include the following in response to processing the command in real time:

Suspend and resume a job (the service) to allow for better management of load time and system resources;

Take a checkpoint on a demand or timely basis or change the originally scheduled checkpoint interval;

Terminate a job in a graceful manner for later restart;

Obtain the status of a job on a demand or time-interval basis;

Commit a set of transactions on the fly based on user requirements;

Perform data warehousing "actions" based on rules that can be defined outside the asynchronous command processing service;

Invoke a user-defined function for an asynchronous command processing service job;

Synchronize multiple data targets that can be loaded concurrently; and/or

Collect operational metadata such as performance statistics, source or target information, job events, etc. into relational tables.

According to an embodiment, at 122, the asynchronous command processing service parses the command to acquire one or more of the following that permits it to interpret and process the command: a name for the service (or job), a name for the command, a name for the operator of the service/job (if present), and/or processing parameter information.

In fact, External commands can be targeted at different services, namely, the "job" (service) level and the "operator" (service) level. The different level of command execution gives users more flexibility to define their "monitoring" and "action" schemes for controlling job execution, regulating system resource usage, and refining job performance.

In an embodiment, the syntax of the command is defined as follows:

CMD <JobName> [JOB | OPER <operator name>] <CommandText>
© 2007 NCR Corporation, Dayton, Ohio CMD is the name of the command interface function, which accepts the various types of asynchronous command processing service commands. The <JobName> parameter is the name of the job at which the <CommandText> is directed. Each command text can be targeted at the JOB or OPER (operator/service) level.

Some Examples of the commands may appear as follows:

CMD MyJob JOB CHECKPOINT
CMD MyJob JOB CHECKPOINT <AT 6:30PM>
CMD MyJob JOB SUSPEND
CMD MyJob JOB RESUME <AT 7:00PM>
CMD MyJob JOB TERMINATE
CMD MyJob OPER StreamOperator "RATE = 4, PERIODICITY = 30"
CMD MyJob OPER DataConnector "VigilWaitTime = 10 SEC, VigilElapsed = 2 HOURS"
© 2007 NCR Corporation, Dayton, Ohio Through the external and internal command interface, the asynchronous command processing service provides a variety of advantages. Some of these advantages include, by way of example only and not by way of limitation:

The asynchronous command processing service allows users to monitor, modify, and control the performance and resource parameters of running jobs through asynchronous commands.

Commands can be issued either by users externally or by components within an asynchronous command processing service job.

Commands can be targeted at different levels, namely, the job level and the operator level.

Commands can be demand-driven, time-driven, event-driven, or data-driven. As a result, the asynchronous command processing service infrastructure is not only driven by external commands, but also driven by information collected through operators.

Through user-defined external rules, commands can be issued based on rule conditions as defined by the user.

In an embodiment, all commands work in an integrated manner with the existing features of TPT (discussed above).

The above advantages not only allow users to have more control of the Active Data Warehouse in real-time, but also enable further integration of conventional and Active Data Warehouses into mission-critical Enterprise Applications.

Figure 2:
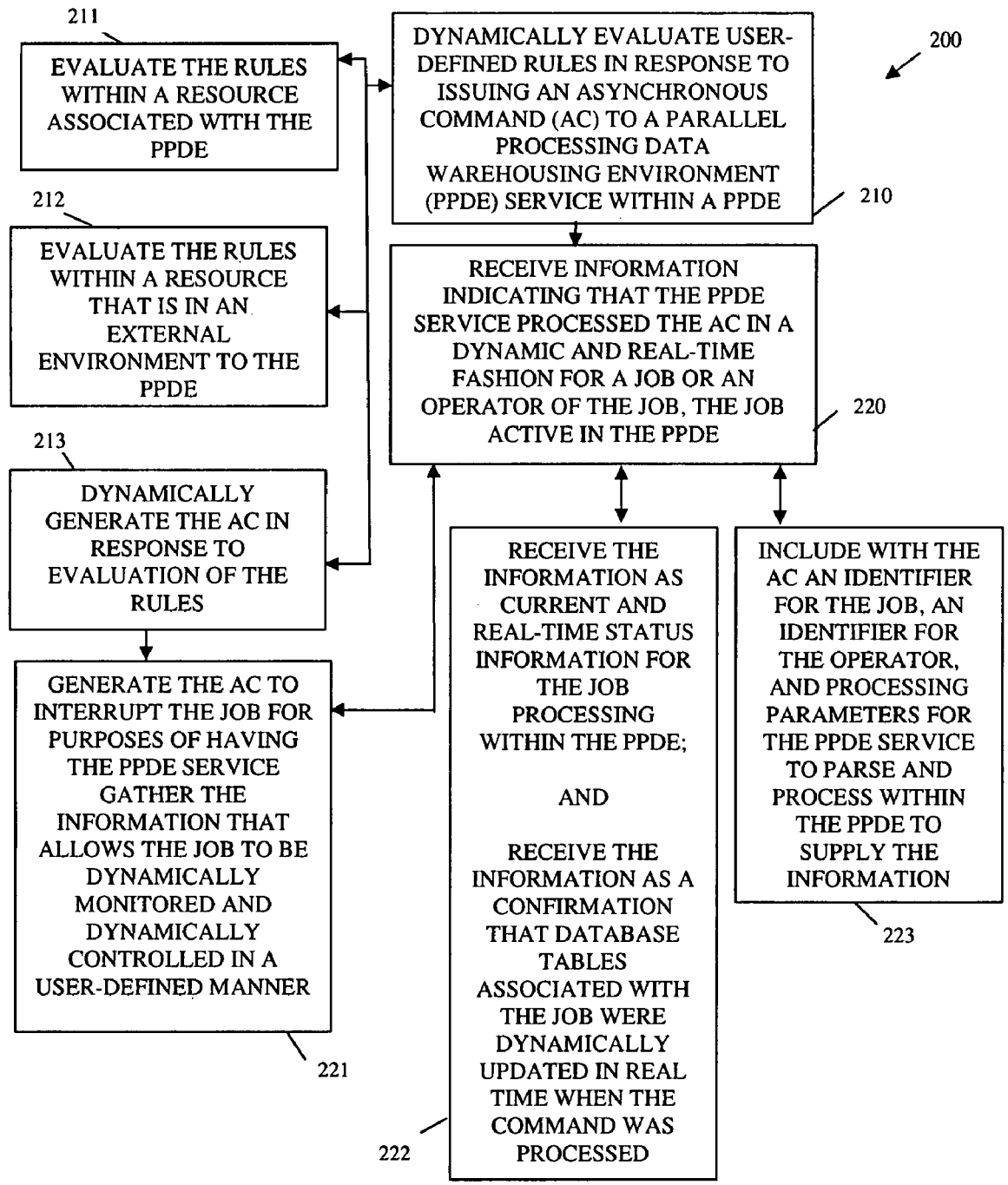
FIG. 2 is a diagram of a method for initially raising or communicating the command processed in the method described above with respect to the FIG. 1, according to an example embodiment.

FIG. 2 is a diagram of a method 200 for initially raising or communicating the command processed in the method 100 described above with respect to the FIG. 1, according to an example embodiment. The method 200 (hereinafter referred to as "asynchronous command raising service") is implemented in a machine-accessible and readable medium as instructions that when executed by a machine performs the processing depicted in FIG. 2. Moreover, asynchronous command raising service is operational over a network, which may be wired, wireless, or a combination of wired and wireless.

The asynchronous command raising service provides a mechanism for initially producing and/or communicating an asynchronous command that was received and processed in the manner discussed above in detail with respect to the method 100 of the FIG. 1. The details of how the command is initially raised and in some cases produced follow with the description of the asynchronous command raising service. (The term "command" and the phrase "asynchronous command" may be used interchangeably herein above and below.)

At 210, the asynchronous command raising service dynamically evaluates user-defined rules and in response thereto issues an asynchronous command (herein after "command") to a parallel processing data warehousing environment service (such as the one presented above with respect to the method 100 of the FIG. 1). The parallel processing data warehousing environment service processes within a parallel processing data warehousing environment.

In an embodiment, at 211, the asynchronous command raising service evaluates the rules within a resource associated with the parallel processing data warehousing environment. In other words, the rule evaluation may occur within a job or an operator of a job.

In another embodiment, at 212, the asynchronous command raising service evaluates the rules within a resource that is in an external environment from the parallel processing data warehousing environment. So, the rules evaluation can occur entirely outside the job or the operator that the command, which raises the command, is associated with.

According to an environment, at 213, the asynchronous command raising service dynamically generates the command in response to the evaluation of the rules. So, the rules may instruct the asynchronous command raising service how to formulate the command or may provide an identity for acquiring the command from a template or repository.

At 220, the asynchronous command raising service receives information indicating that the parallel processing data warehousing environment service processed the command in a dynamic and real-time fashion for a particular job or an operator of the job. The job and any operators are actively processing with the parallel processing data warehousing environment.

In an embodiment, at 221, the asynchronous command raising service generates the command to interrupt the job for purposes of having the parallel processing data warehousing environment service gather information that allows the job to be dynamically monitored, modified, and controlled in a user-defined manner.

The information can be received as a variety of types of data associated with the original command.

For example, at 222, the asynchronous command raising service receives the information as current and real-time status information for the job processing within the parallel processing data warehousing environment. The information can also represent a confirmation indicating that database tables associated with the job were dynamically updated in real time when the command was processed. This latter situation permits other operators or processes to have immediate updated data for the job in near real time as soon as the command is processed. Near real time reflects the fact that changes to the data may occur after the real-time update and before a particular operator or process is actually serviced.

In an embodiment, at 223, the asynchronous command raising service includes with the command a variety of useful information that is subsequently parsed and processed by the parallel processing data warehousing environment service. Some of this information includes, but is not limited to, an identifier for the job, an identifier for any operator, and processing parameters for the parallel processing data warehousing environment service to use when processing the command within the parallel processing data warehousing environment. In response to processing the command the parallel processing data warehousing environment supplies the information.

Figure 3:
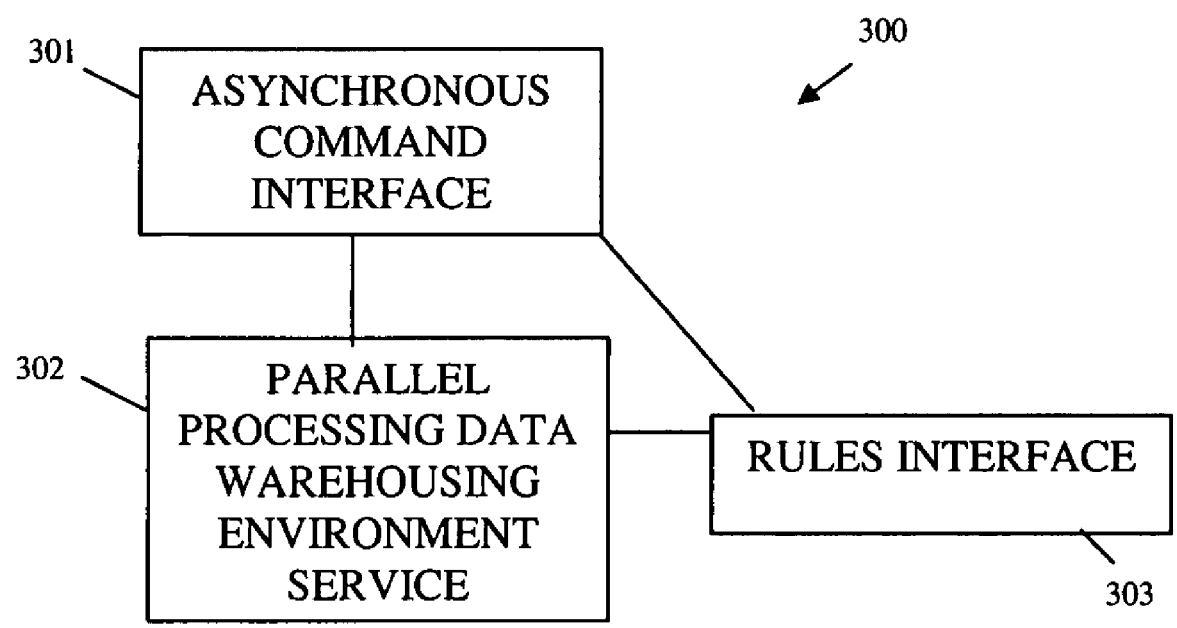
FIG. 3 is a diagram of an asynchronous command processing system, according to an example embodiment.

FIG. 3 is a diagram of an asynchronous command processing system 300, according to an example embodiment. The asynchronous command processing system 300 is implemented in a machine-accessible and readable medium as instructions that when executed by a machine performs a variety of processing, such as the processing discussed in detail above with reference to the methods 100 and 200 of the FIGS. 1 and 2.

The asynchronous command processing system 300 includes an asynchronous command interface 301 and a parallel processing data warehousing environment service 302. In an embodiment, the asynchronous command processing system 300 also includes a rules interface 303. Each of these and their interactions with one another will now be discussed in detail.

The asynchronous command interface 301 is implemented within a machine-accessible and readable medium and commands produced by the asynchronous command interface 301 are processed by a machine.

The asynchronous command interface 301 provides a mechanism for commands to be issued from inside or outside the parallel processing data warehousing environment. The types of commands and format for the commands were discussed above with reference to the method 100 of the FIG. 1. Moreover, the manner in which the commands are generated and raised were discussed above with reference to the method 200 of the FIG. 2.

In essence the commands identify a job and an action to take with respect to the job or with respect to a component of the job, such as a consumer or producer operator.

In an embodiment, the commands are produced/generated via the asynchronous command interface 301 and classified as being one or more of the following types: demand-based commands, time-based commands, event-based commands, and/or data-driven commands. Again, explanation for these types of commands were discussed in detail above with reference to the method 100 of the FIG. 1.

The parallel processing data warehousing environment service 302 is implemented in a machine-accessible and readable medium as instructions that process on the machine or a different machine of the network. Example processing associated with the parallel processing data warehousing environment service 302 was presented above in detail with reference to the asynchronous command processing service represented by the method 100 of the FIG. 1.

The parallel processing data warehousing environment service 302 processes within the parallel processing data warehousing environment. In an embodiment, the parallel processing data warehousing environment service 302 is an enhanced version of the TPT (discussed above).

The parallel processing data warehousing environment service 302 receives the commands in an asynchronous fashion and dynamically processes the commands for purposes of dynamically monitoring, modifying, and/or controlling an existing job or component of the job. The job or the component of the job is actively processing within the parallel processing data warehousing environment.

The asynchronous command processing system 300 may also include a rules interface 303. The rules interface 303 is implemented in a machine-accessible and readable medium and is to process on a machine to generate user-defined rules produced by a user.

The rules interface 303 assists in generating and configuring rules. The rules define when the commands are to be provided to the parallel processing data warehousing environment service 302.

In an embodiment, at least some rules are embedded within one or more resources that are internal to the parallel processing data warehousing environment.

In another case, at lease some rules are embedded within one or more resources that are external to the parallel processing data warehousing environment.

A user-defines rules for generating and communicating commands. The commands permit dynamic modification, control, and monitoring of jobs or components of jobs that actively process within the parallel processing data warehousing environment. The benefits and advantages of this were discussed in detail above with reference to the methods 100 and 200 of the FIGS. 1 and 2, respectively.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
   receiving an asynchronous command for a service, the service is already processing in real time within a parallel processing data warehousing environment, the command originates from an operator that triggered the command based on one or more data patterns detected in the parallel processing data warehousing environment; and
   dynamically processing the command within the parallel processing data warehousing environment to: gather information about the service, perform an action on the service, schedule the action for the service, configure the service for the service to perform a subsequent action, perform one or more additional actions associated with one or more resources, and alter the processing associated with the service.

2. The method of claim 1, wherein receiving further comprises externally receiving the asynchronous command, which is generated in response to a set of user-defined rules evaluated in an external environment that is external to the parallel processing data warehousing environment.

3. The method of claim 1, wherein receiving further comprises receiving the asynchronous command as an internally generated command that is internal to the parallel processing data warehousing environment and that is received from the service or another resource of the parallel processing data warehousing environment.

4. The method of claim 1, wherein receiving further comprises identifying the asynchronous command as one of the following:
   a demand-based command seeking on-demand control of access to data, to the one or more resources, or to the service within the parallel processing environment;
   a time-based command driven by date-time or time intervals within the parallel processing data warehousing environment;
   an event-based command driven by events defined by conditions within the parallel processing data warehousing environment; or
   a data-driven command driven by the service that defines a level of information occurring within the parallel processing data warehousing environment to trigger the command processing.

5. The method of claim 1 further comprises, recognizing the service as a job processing within the parallel processing data warehousing environment or as the operator processing within the job.

6. The method of claim 1, wherein dynamically processing further comprises one or more of the following:
   suspending or resuming the service;
   taking a checkpoint on demand or timed-bases for the service;
   changing an original scheduled checkpoint for the service;
   terminating the service;
   obtaining a status for the service on demand or timed-bases;
   committing a set of transactions on-the-fly in response to user-defined criteria;
   performing data warehouse actions in response to rules defined by a user in an environment that is external to the parallel processing data warehousing environment;
   invoking a user-defined function for the service;
   synchronizing multiple data targets that are loaded concurrently within the data warehouse; and
   collecting operational metadata that includes statistics, source information, target information, or service events for loading into relational database tables.

7. The method of claim 1, wherein dynamically processing further comprises parsing the command to acquire one or more of the following: a name for the service, a name for the command, a name for the operator of the service, and processing parameter information.

8. A machine-implemented method, comprising:
   dynamically evaluating user-supplied rules and in response thereto issuing an asynchronous command to a parallel processing data warehousing environment service that is executing within a parallel processing data warehousing environment, evaluation of the rules provide an identity for acquiring the command from a template; and
   receiving information indicating that the parallel processing data warehousing environment service processed the command in a dynamic and real-time fashion for an operator of a job, the operator is actively executing within the parallel processing data warehousing environment, and the job is identified in the command.

9. The method of claim 8, wherein evaluating further comprises evaluating the user-supplied rules within a resource associated with the parallel processing data warehousing environment.

10. The method of claim 8, wherein evaluating further comprises evaluating the user-supplied rules within a resource that is in an external environment that is external to the parallel processing data warehousing environment.

11. The method of claim 8, wherein evaluating further comprises dynamically generating the command in response to evaluating the rules.

12. The method of claim 11, wherein dynamically generating further comprises generating the command to interrupt the job for purposes of having the parallel processing data warehousing environment service gather the information that allows the job to be dynamically monitored and dynamically controlled in a user-defined manner.

13. The method of claim 8, wherein dynamically generating further comprises one or more of the following:
receiving the information as current and real-time status information for the job processing within the parallel processing data warehousing environment; and
receiving the information as a confirmation that database tables associated with the job were dynamically updated in real time when the command was processed.

14. The method of claim 8 further comprising including with the command an identifier for the job, an identifier for the operator, and processing parameters for the parallel processing data warehousing environment service to parse and process within the parallel processing data warehousing environment to supply the information.

15. A machine-implemented system comprising:
an asynchronous command interface implemented in a machine-accessible medium, wherein commands produced from the asynchronous command interface are processed on a machine; and
a parallel processing data warehousing environment service implemented in a machine-accessible and readable medium and to process on the machine or a different machine;
the parallel processing data warehousing environment service processes within a parallel processing data warehousing environment and receives the commands in an asynchronous fashion and dynamically processes the commands for dynamically monitoring, modifying, and controlling a component of a job that is actively processing within the parallel processing data warehousing environment, the component is an operator of the job.

16. The system of claim 15 further comprising a rules interface implemented in a machine accessible and readable medium and to process on a machine to generate rules, the rules define when the commands are provided to the parallel processing data warehousing environment service.

17. The system of claim 16, wherein rules are embedded within one or more resources that are external to the parallel processing data warehousing environment.

18. The system of claim 16, wherein the rules are embedded within one or more resources that are internal to the parallel processing data warehousing environment.

19. The system of claim 15, wherein the commands identify the job and an action to take with respect to the job or the component of the job.

20. The system of claim 15, wherein the commands are generated and classified from the asynchronous command interface as being one or more of the following types: demand-based commands, time-based commands, event-based commands, and data-driven commands.

* * * * *